United States Patent
Biesinger et al.

[19]

[11] Patent Number: 6,062,602
[45] Date of Patent: May 16, 2000

[54] DEVICE FOR MOUNTING A FUNCTIONAL PART TO A BODY-IN-WHITE OF A MOTOR VEHICLE

[75] Inventors: Ursula Biesinger, Nufringen; Bernd Schray, Aidlingen; Manfred Schulz, Wildberg, all of Germany

[73] Assignee: DaimlerChrysler AG, Germany

[21] Appl. No.: 09/015,343

[22] Filed: Jan. 29, 1998

[30] Foreign Application Priority Data

Jan. 31, 1997 [DE] Germany .......................... 197 03 520

[51] Int. Cl.$^7$ .............................. B62D 21/00; F16B 37/04
[52] U.S. Cl. ........................... 280/781; 180/311; 296/29; 411/112
[58] Field of Search ................................... 280/781, 785, 280/800; 411/112, 111, 104; 180/311, 312; 296/29, 204

[56] References Cited

U.S. PATENT DOCUMENTS

| 4,861,182 | 8/1989 | Gillet | 411/112 |
| 4,875,816 | 10/1989 | Peterson | 411/112 |
| 5,193,643 | 3/1993 | McIntyre | 411/112 |

FOREIGN PATENT DOCUMENTS

| 43 21 922 | 1/1995 | Germany . |
| 43 43 642 | 6/1995 | Germany . |
| 195 33 138 | 11/1996 | Germany . |

*Primary Examiner*—Peter C. English
*Attorney, Agent, or Firm*—Evenson, McKeown, Edwards & Lenahan, P.L.L.C.

[57] ABSTRACT

A device for securing a functional part on a body-in-white of a motor vehicle. The mounting location of the body-in-white is designed as a receptacle that has an opening in a bottom to bring the screw parts together and the screw part on the body-in-white side is held in a cage that is adapted to the dimensions of the receptacle for insertion into the tub-shaped receptacle. The cage is capable of being secured in the receptacle via a latching connection, with at least two latching points being provided at walls of the receptacle at a distance from one another, and with at least two matching latching elements being provided on corresponding support sections of the cage.

11 Claims, 4 Drawing Sheets

DEVICE FOR MOUNTING A FUNCTIONAL PART TO A BODY-IN-WHITE OF A MOTOR VEHICLE

BACKGROUND OF THE INVENTION

This application claims the priority of German patent application 197 03 520.5 filed Jan. 31, 1997 in Germany, the disclosure of which is expressly incorporated by reference herein.

The invention relates to a device for mounting a functional part at a mounting location of a body-in-white of a motor vehicle. The "body-in-white" refers to the welded body shell to which additional functional parts (e.g. axles, transmission, etc.) are to be connected. The body-in-white has a screw connection provided with two screw parts, with a screw part of the body-in-white being located at the mounting location of the body-in-white and a screw part on the functional side being located on the functional part. The mounting location on the body-in-white is designed as a receptacle, the receptacle having an opening in the bottom for bringing the screw parts together, and with the screw part on the body-in-white being retained in a cage.

A mounting device is known from German patent document DE 195 33 138 C1. This known device has a threaded nut as a screw part on the body-in-white, said threaded nut being retained loosely in a cage that is firmly connected with the body-in-white. In the unscrewed state the threaded nut is positioned by means of a retainer at a radial distance from the cage and at an axial distance from the through opening in the cage.

It is also known from German patent document DE 43 43 642 A1 to provide a section of a body-in-white with recesses in opposite section walls, into which recesses a bridge-like base with an insertion nut can be inserted. When fully inserted, a nose of the base grasps the insertion nut by a recess, so that a secure positioning of the insertion nut in the profile is assured.

German patent document DE 43 21 922 A1 teaches a body-in-white of a motor vehicle on which nuts are held by welded connections. For this purpose, a fixed cage is provided on the body-in-white, into which cage a base of a threaded nut is capable of being inserted from one side, said nut, in the inserted stage, projecting out of the cage with a cylindrical part that has an internal thread.

Additional devices of this kind (known, for example, from Mercedes-Benz automobiles) serve to secure axles, propeller shafts, transmissions, or other assemblies of the vehicle to the body-in-white or for securing lengthwise members, cross members, brackets, holders, or the like, not welded to the body-in-white, at corresponding mounting locations on the body-in-white of the motor vehicle. The known mounting devices have threaded plates as the screw parts on the body-in-white to which the functional parts to be secured, for example those listed above, can be secured with the aid of matching screw parts on the functional side, said threaded plates being welded by suitable welded seams to the mounting locations on the body-in-white. If the welded seams are automatically provided by robots, it may occur that the threaded plate is not positioned at the location where the robot provides a corresponding welded seam. To ensure sufficient quality and strength of the weld in every case, therefore, it was necessary to monitor all of the workpieces. If insufficient welding of the threaded plate to the body-in-white was found in an individual case, this body had to be corrected and the welding performed manually. The disadvantage in this connection therefore is a high testing expense and additional work to be performed despite the mechanization.

SUMMARY OF THE INVENTION

A goal of the invention is to provide a device of the type generally described above that guarantees a reliable mounting of a functional part at the mounting location on the body-in-white regardless of whether the functional part is assembled automatically or manually.

This and other goals have been achieved according to the present invention by providing a device for securing a functional part on a mounting part of a body-in-white of a motor vehicle, said body-in-white having a screw connection provided with two screw parts, with one of said screw parts on the body-in-white side being located at the mounting location of the body-in-white and a screw connection on the functional side being located at the functional part, with the mounting location of the body-in-white being designed as a receptacle, said receptacle having an opening in its bottom for bringing the screw parts together, and with the screw part on the body-in-white being held in a cage, wherein said cage is adapted to the dimensions of said receptacle for insertion into said receptacle and is capable of being secured in receptacle via a latching connection, with at least two latching points being provided at walls of said receptacle located at a distance from one another and at least two matching latching elements being provided on corresponding support sections of said cage.

This and other goals have been achieved according to the present invention by providing an arrangement for securing a threaded element to a body-in-white of a motor vehicle, comprising: a receptacle formed in said body-in-white, said receptacle being generally U-shaped in cross-section with a base portion and with first and second side portions, said base portion defining a base opening, and said first and second side portions defining first and second openings, respectively; a threaded plate including a tubular portion and a flange portion, said tubular portion defining a threaded opening to be threadedly mated with said threaded element, said flange portion extending exteriorly of said tubular portion and having first and second oppositely facing surfaces, said threaded plate being arranged with said tubular portion extending through said base opening in the receptable and with said first surface of said flange portion abutting said base portion of the receptacle; and a cage including an engagement surface and first and second latching elements, said cage being arranged such that said engagement surface engages said second surface of said flange portion facing opposite said first surface, said first and second latching elements engaging said receptacle at said first and second openings.

The cage is suitable for insertion into the receptacle, matching the dimensions of the receptacle, and can be secured in the receptacle via a latching connection, with at least two latching points being provided on walls of the receptacle located at a distance from one another and at least two matching latching elements being provided on matching supporting parts of the cage. The receptacle is preferably in the form of a trough, a U-shaped hollow member, a matching bracket, or the like. As a result of the solution according to the invention, welding or similar connections between the screw part on the body-in-white and the mounting location on the body-in-white are avoided. The screw part on the body-in-white is instead secured to the body-in-white in simple fashion by means of a cage with a latching connection. Because the screw part on the body-in-white, including the cage, is placed in the receptacle, secure retention of the screw part on the body-in-white is achieved even if the latching connection has not yet reached its final latching position, since the walls of the receptacle secure the cage including the screw part on the body-in-white. The latching points and the latching elements can be made in the form of recesses or as latching hooks, latching tongues, latching noses, or the like that engage the recesses.

According to certain preferred embodiments, the screw part on the body-in-white is made in the form of a threaded plate provided with a threaded passageway, said plate being retained relative to the screw axis with radial play in the cage, with the opening in the receptacle being adapted in terms of its dimensions to the maximum radial play of the threaded plate. This design makes it possible to compensate for position tolerances of the functional screw part since the screw part on the body-in-white in the form of the threaded plate can be adapted in simple fashion by radial displacement to the position of the screw part on the functional side.

According to certain preferred embodiments, a threaded passageway in the threaded plate extends through the opening in S the receptacle. As a result, securing the screw part on the functional side is simplified since the positioning of the threaded plate and of the threaded passageway can be detected from the opposite side to which the matching functional part is fastened.

According to certain preferred embodiments, the cage is made in the form of a one-piece sheet metal part that has retaining tabs to secure the threaded plate and has latching tongues that serve as latching elements to secure the cage in latching recesses in the receptacle that serve as matching latching points. This is an especially simple design that can be manufactured economically for the cage, with the cage and the threaded plate being capable of being fitted together by a matching bending of the retaining tabs in simple fashion to form a preassembled structural unit.

According to certain preferred embodiments, the receptacle is an integral part of the body-in-white. As a result the receptacle is integrated into the body-in-white, so that no additional work steps are necessary for subsequently securing the receptacle on the body-in-white.

According to certain preferred embodiments, the cage has stop tongues to limit the radial freedom of play of the threaded plate. The positioning of these stop tongues is advantageously adapted to the maximum tolerance compensation of the threaded plate.

According to certain preferred embodiments, the latching connection is releasably designed. As a result, the screw part on the body-in-white can be replaced in simple fashion.

Other objects, advantages and novel features of the present invention will become apparent from the following detailed description of the invention when considered in conjunction with the accompanying drawings.

DETAILED DESCRIPTION OF THE DRAWINGS

A body-in-white 1 for an automobile has a rear axle 8 in its rear area, said axle being secured to body-in-white 1 at several mounting locations with the aid of a bearing 7 at each point. The axle is secured at each mounting location by means of a device according to the invention, with a device according to the invention of this kind also being able to serve for securing other functional parts such as other assemblies or other supporting parts.

Figure 1:
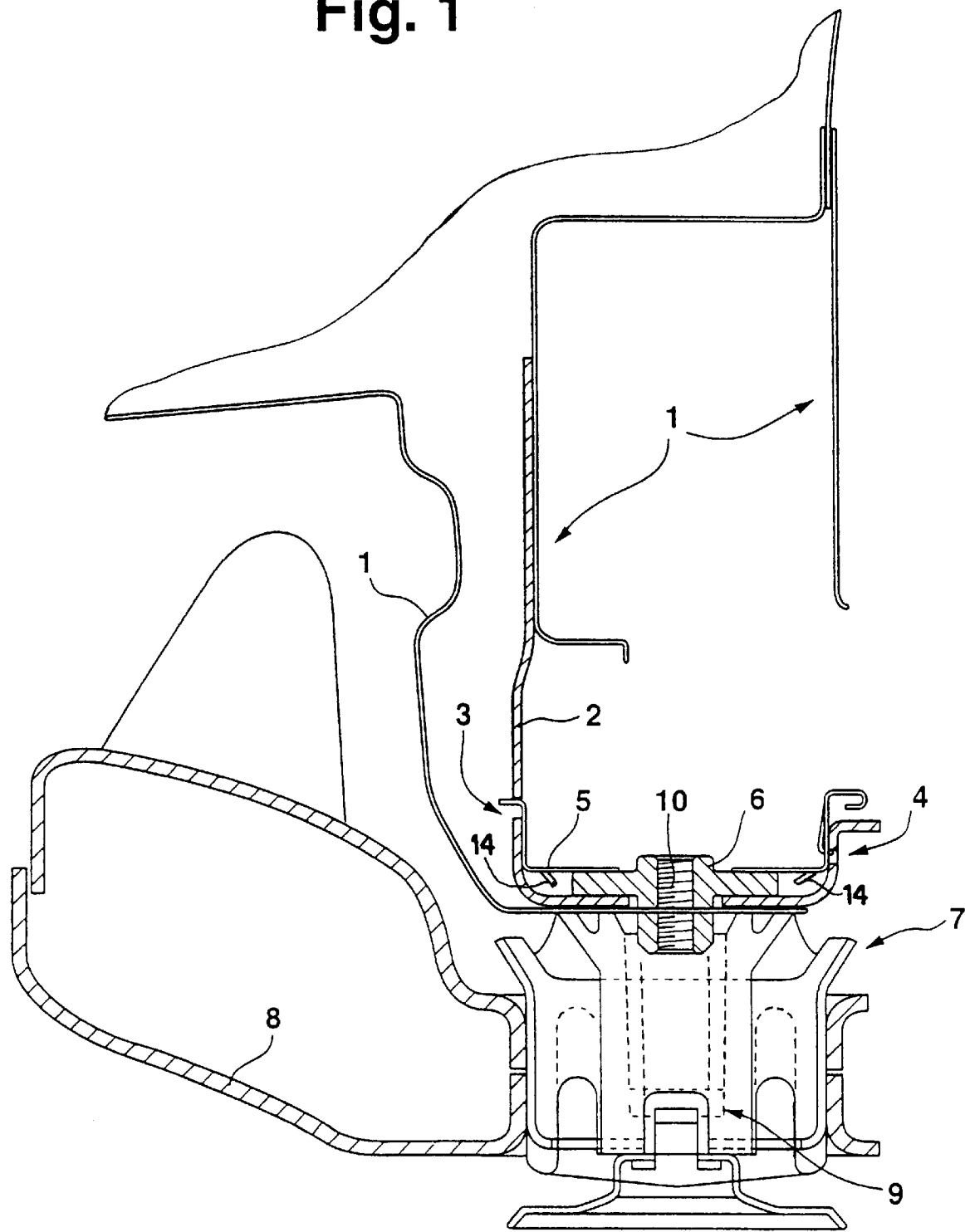
FIG. 1 shows a portion of a body-in-white of an automobile in the vicinity of a rear axle, with the rear axle being mounted via a device according to a preferred embodiment of the present invention.
Figure 2:
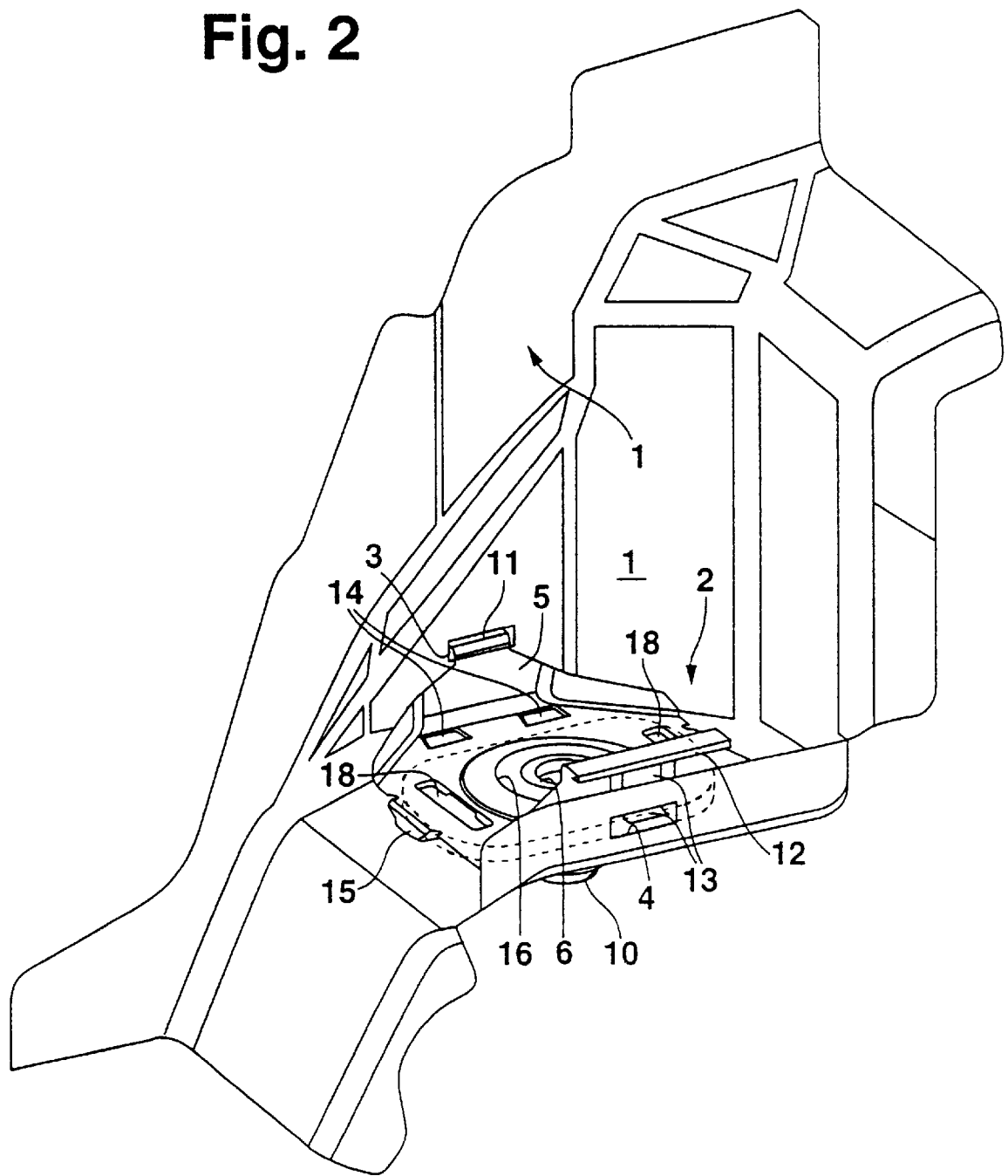
FIG. 2 is an elevated perspective view of the mounting device of FIG. 1.
Figure 3:
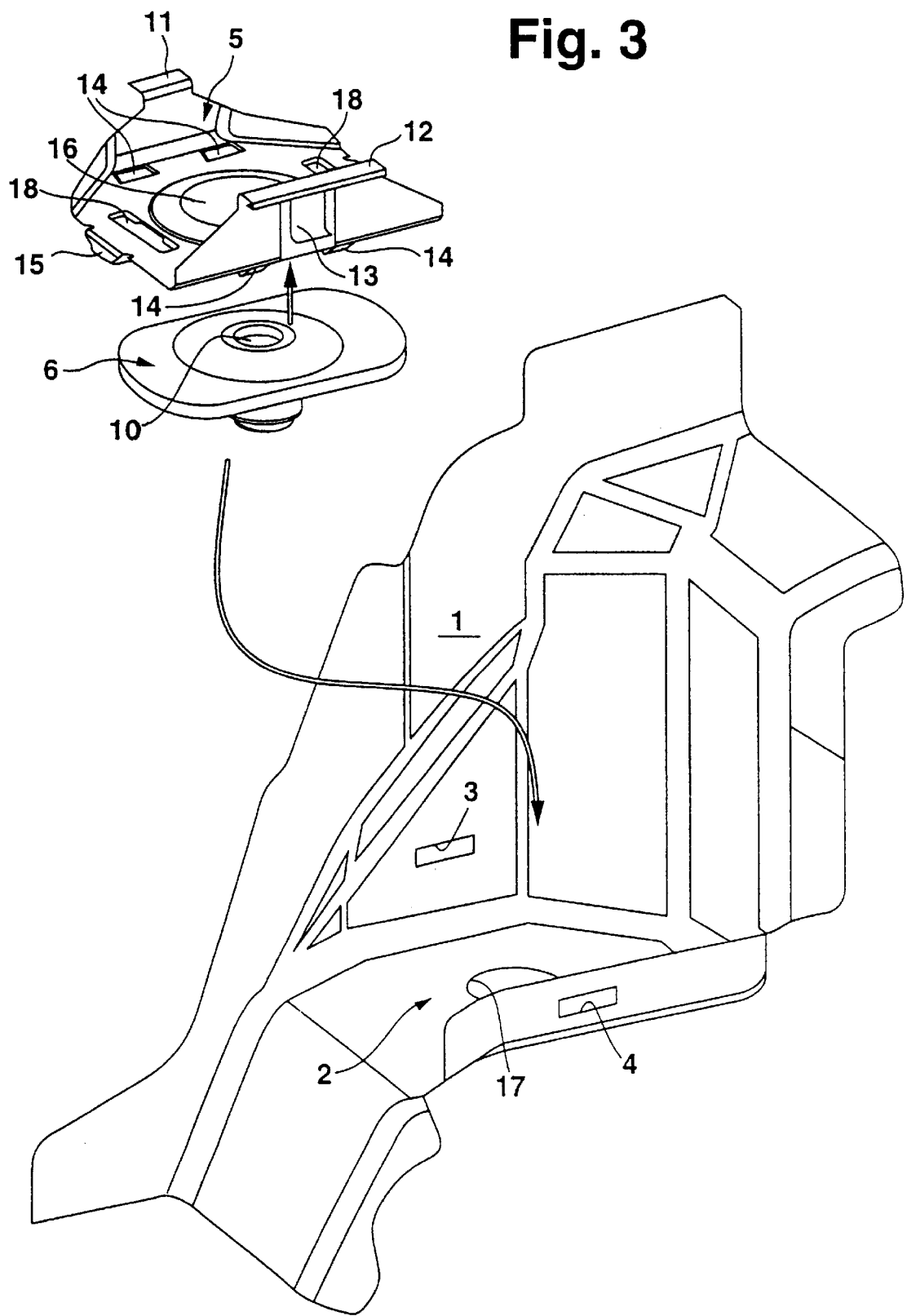
FIG. 3 is a perspective exploded view of the mounting device of FIG. 2.

In FIG. 1, a front lateral mounting location for rear axle 8 is shown. The lateral mounting location provided opposite for rear axle 8 is designed in identical fashion. The connection of rear axle 8 to body-in-white 1 is performed in the vicinity of a receptacle 2 that has thicker walls than the other sheet metal parts of the body-in-white, said receptacle being embedded between a rear floor reinforcement and a rear lengthwise member part of body-in-white 1. Receptacle 2 is made in the shape of a tub and has a vertical wall section on each of two opposite sides, in each of which wall sections a rectangular recess 3, 4 is provided. A floor of receptacle 2 that extends approximately horizontally and flat is provided with a circular opening that provides a bottom opening for receptacle 2 for connection of rear axle 8.

Bearing 7 of rear axle 8 is screwed by means of a screw element 9 with a matching screw part 6, 10 in receptacle 2, as described below in greater detail and thus is secured to the underside of receptacle 2 and body-in-white 1. A threaded plate 6 is located in receptacle 2 for this purpose, said plate being composed of an approximately flat oval plate and a threaded opening 10 that projects at right angles from plate 6 and is made in one piece. Threaded opening 10 passes through opening 17 downward with threaded plate 6, 10 in the mounted state.

Threaded plate 6, 10 is secured in receptacle 2 by means of a cage 5, said cage being in the form of a one-piece sheet metal part and having a flat plate section that rests on the top of threaded plate 6, 10. A circular opening 16 is provided in cage 5, the diameter of said opening being larger than the diameter of an upwardly projecting base of threaded opening 10. Opening 17 in receptacle 2 also has a larger diameter than the outside diameter of a downwardly projecting base of threaded opening 10.

Figure 4:
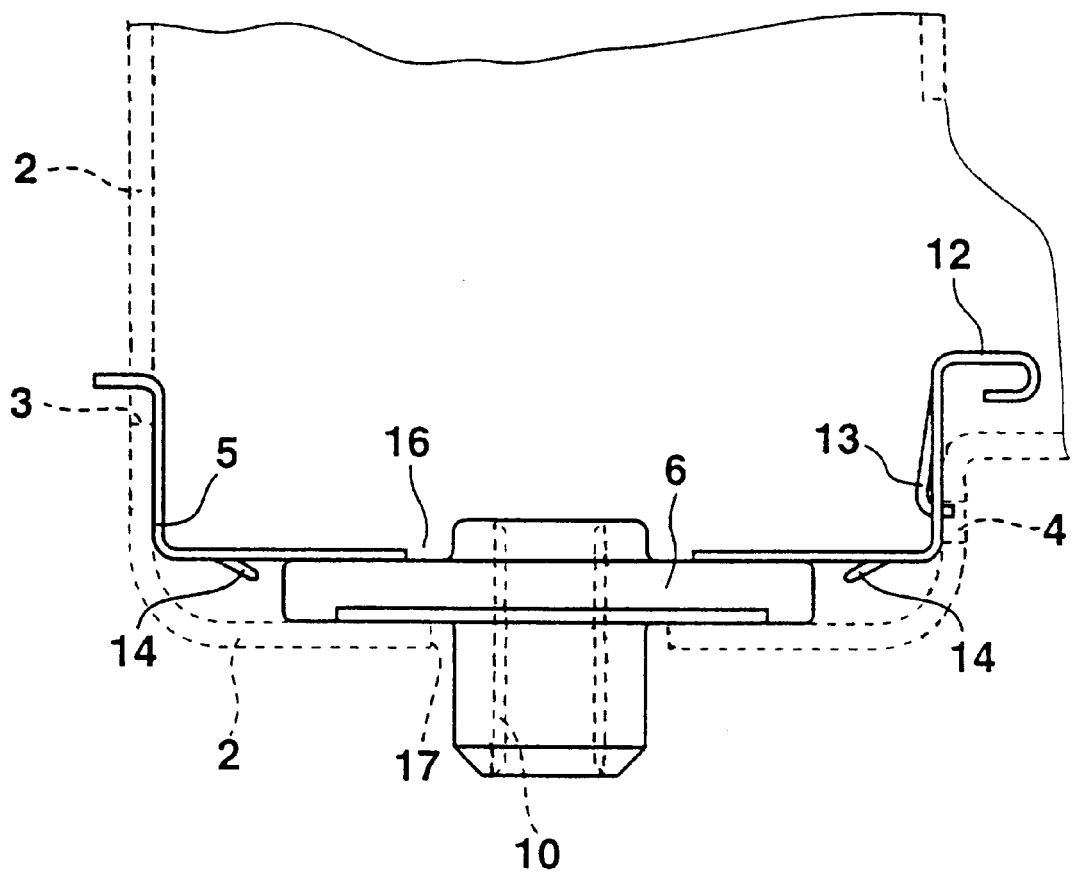
FIG. 4 is an enlarged schematic lateral view of the mounting device.

The opposite rounded faces of threaded plate 6 are secured with the aid of retaining tabs 15 on the underside of the plate section of cage 5. The ribs of each retaining tab 15, projecting vertically downward, are located at a distance from the edges of the faces of threaded plate 6, so that threaded plate 6 can be displaced in the direction of retaining tabs 15 with radial play. On the opposite sides of threaded plate 6, two tongue-shaped stop ribs 14 are forced out diagonally downward from the plate section of cage 5 (FIG. 4), with the free end edges of said ribs being likewise located at a distance from the matching side edges of threaded plate 6. As a result, threaded plate 6 can be moved radially, including in the direction of these stop ribs 14, with a certain freedom of play. In order to ensure a secure contact between the top of threaded plate 6 and the underside of the plate section of cage 5, the plate section of cage 5 in each case has two reinforcing ribs 18 adjacent to retaining tabs 15, said ribs being pushed out downward in one piece from the plate section to form linear contact areas for the top of threaded plate 6.

Threaded plate 6 is held on cage 5 by retaining tabs 15 in such fashion that threaded plate 6 can be moved with a certain amount of radial play but have no axial play relative to the screw axis of threaded opening 10.

Adjacent to stop ribs 14, cage 5 has two wall sections on two opposite sides, said sections projecting upward, being rib-shaped, and serving as supporting sections, with one wall section being provided with a latching rib 11 that projects outward at right angles and the other wall section being provided with an elastically flexible rib-shaped latching tongue 13. The elastic flexibility of latching tongue 13 is achieved by a suitable U-shaped cutout in the wall section. Latching tongue 13 projects freely downward and is connected at its upper end with the wall section. This upper edge of the wall section is reinforced by a reinforcing rib 12 that projects outward at right angles, the free end of said rib being bent around into the shape of a U. Latching tongue 13 has a retaining nose that likewise projects outward, said nose being formed in one piece on latching tongue 13. The retaining nose is designed in the manner of a rib.

In the mounted state, latching tongue 13, with its retaining nose, fits behind an upper edge of recess 4 and latching rib 11 has its upper side pressed against the upper edge of the opposite recess 3. The elastic flexibility of latching tongue 13 compensates for tolerances so that threaded plate 6 and retaining tongues 15 of cage 5 are held at the bottom of recess 2. By simply loosening latching tongue 13, cage 5 together with threaded plate 6 can be removed once again from receptacle 2. Since threaded plate 6 abuts the bottom of receptacle 2 and latching connections are simultaneously provided by latching rib 11, latching tongue 13, and the two recesses 3, 4, a shapewise securing of cage 5 in receptacle 2 is ensured in each case, threaded plate 6 is held in receptacle 2 without danger of loss and is therefore held on body-in-white 1 as well. The radial displaceability of threaded plate 6 within cage 5 and the dimensioning of opening 17 of receptacle 2 that is made large relative to threaded opening 10 guarantee a tolerance compensation relative to the position of bearing 7 of rear axle 8, so that screw element 9 can always be secured in threaded opening 10 and hence on threaded plate 6.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An arrangement for securing a threaded element to a body-in-white of a motor vehicle, comprising:

a receptacle formed in said body-in-white, said receptacle being generally U-shaped in cross-section with a base portion and with first and second side portions, said base portion defining a base opening, and said first and second side portions defining first and second openings, respectively;

a threaded plate including a tubular portion and a flange portion, said tubular portion defining a threaded opening to be threadedly mated with said threaded element, said flange portion extending exteriorly of said tubular portion and having first and second oppositely facing surfaces, said threaded plate being arranged with said tubular portion extending through said base opening in the receptacle and with said first surface of said flange portion abutting said base portion of the receptacle; and a cage including an engagement surface and first and second latching elements, said cage being arranged such that said engagement surface engages said second surface of said flange portion facing opposite said first surface, said first and second latching elements engaging said receptacle at said first and second openings.

2. A device for securing a functional part on a mounting part of a body-in-white of a motor vehicle, said device comprising:

a screw connection provided with two screw parts, wherein one of said screw parts is located at a mounting location on the body-in-white and another of said screw parts is located on the functional part, wherein the mounting location comprises a receptacle having an opening in a bottom thereof for bringing the screw parts together, wherein the screw part on the body-in-white is held in a cage, said cage being adapted to the dimensions of said receptacle for insertion into said receptacle and is capable of being secured in said receptacle via a latching connection comprising at least two latching points provided on walls of said receptacle located at a distance from one another and at least two matching latching elements provided on corresponding support sections of said cage, wherein the screw part on the body-in-white comprises a threaded plate having a threaded opening that projects through said opening in the receptacle.

3. A device according to claim 2, wherein said plate is retained in the cage with radial play relative to an axis of the screw connection, with said opening in said receptacle being dimensionally adapted to a maximum radial play of said threaded plate.

4. A device according to claim 3, wherein said cage is designed as a one-piece sheet metal part, said sheet metal part having retaining tabs to secure said threaded plate and having latching ribs serving as said latching elements to secure the cage in respective latching recesses of the receptacle that serve as matching latching points.

5. A device according to claim 4, wherein said cage has stop ribs to limit the radial freedom of play of the threaded plate.

6. A device according to claim 3, wherein said cage has stop ribs to limit the radial freedom of play of the threaded plate.

7. A device according to claim 2, wherein said receptacle is an integral part of said body-in-white.

8. A device according to claim 7, wherein said latching connection is releasable.

9. A device according to claim 2, wherein said latching connection is releasable.

10. A device according to claim 2, wherein said receptacle is made in the shape of a tub or as part of a U-shaped hollow member or as part of a bracket.

11. A device according to claim 2, wherein the cage matches the dimensions of the receptacle.

* * * * *